United States Patent
Padmanabhan et al.

(10) Patent No.: US 12,498,962 B2
(45) Date of Patent: Dec. 16, 2025

(54) FAULT-TOLERANT NO CODE WORKFLOWS

(71) Applicant: STRIPE, INC., South San Francisco, CA (US)

(72) Inventors: Niranjan Padmanabhan, San Francisco, CA (US); Benjamin Mays, Austin, TX (US); Molly Hanes, Houston, TX (US); Ankita Gupta, Singapore (SG)

(73) Assignee: Stripe, Inc., South San Francisco, CA (US)

( * ) Notice: Subject to any disclaimer, the term of this patent is extended or adjusted under 35 U.S.C. 154(b) by 946 days.

(21) Appl. No.: 17/694,090

(22) Filed: Mar. 14, 2022

(65) Prior Publication Data
US 2023/0289209 A1 Sep. 14, 2023

(51) Int. Cl.
*G06F 9/50* (2006.01)
*G06F 3/0486* (2013.01)
*G06F 9/48* (2006.01)

(52) U.S. Cl.
CPC .............. *G06F 9/48* (2013.01); *G06F 3/0486* (2013.01)

(58) Field of Classification Search
CPC .................................. G06F 8/34; G06F 3/0486
See application file for complete search history.

(56) References Cited

U.S. PATENT DOCUMENTS

| | | | |
|---|---|---|---|
| 11,435,871 B1* | 9/2022 | Luvaas | G06F 3/04817 |
| 2018/0349812 A1* | 12/2018 | Alvarez | G06Q 10/0633 |
| 2019/0004773 A1* | 1/2019 | Hoberman | G06F 16/22 |
| 2020/0341619 A1* | 10/2020 | Rogers | G06F 9/451 |
| 2021/0133656 A1* | 5/2021 | Barbitta | H04L 51/212 |
| 2021/0382611 A1* | 12/2021 | Gan | G06F 8/34 |
| 2022/0129283 A1* | 4/2022 | Sharma | G06F 8/31 |
| 2023/0016233 A1* | 1/2023 | Gubbi Lakshminarasimha | G06N 20/00 |

* cited by examiner

*Primary Examiner* — Brian W Wathen
(74) *Attorney, Agent, or Firm* — BAKERHOSTETLER

(57) ABSTRACT

A method and system for defining and executing a workflow are described. the method comprises presenting, on a first section of a user interface (UI), a plurality of UI components associated with a plurality of tasks to be performed, where each UI component is associated with one task. The method further comprises, in response to one or more UI components of the plurality of UI components associated with one or more tasks of the plurality of tasks being moved from the first section of the UI to a second section of the UI, dynamically creating the workflow based on the one or more UI components and an order in which the one or more UI components being positioned in the second section of the UI, and executing the workflow to perform the one or more tasks of the plurality of tasks.

23 Claims, 11 Drawing Sheets

FAULT-TOLERANT NO CODE WORKFLOWS

FIELD

Embodiments of the present disclosure relate to the field of systems for workflows; more particularly, embodiments of the present disclosure relate to creating and executing a workflow.

BACKGROUND

There are a lot of workflows that happen across every kind of business and industry. It may be time consuming to develop the workflows. For example, it may take many weeks to build important workflows for a commerce payment processing system. Currently, the workflows need to be created from scratch by trained engineers. A non-technical person need to wait for the engineers to build and test the workflows, which may cause delay and consume engineering resources.

SUMMARY

A method and system for defining and executing a workflow are described. In one embodiment, the method comprises presenting, on a first section of a user interface (UI) a plurality of UI components associated with a plurality of tasks to be performed, where each UI component of the plurality of UI components is associated with one task of the plurality of tasks. The method further comprises, in response to one or more UI components of the plurality of UI components associated with one or more tasks of the plurality of tasks being moved from the first section of the UI to a second section of the UI, dynamically creating the workflow based on the one or more UI components and an order in which the one or more UI components being positioned in the second section of the UI. The method further comprises executing the workflow to perform the one or more tasks of the plurality of tasks.

BRIEF DESCRIPTION OF THE DRAWINGS

The present disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
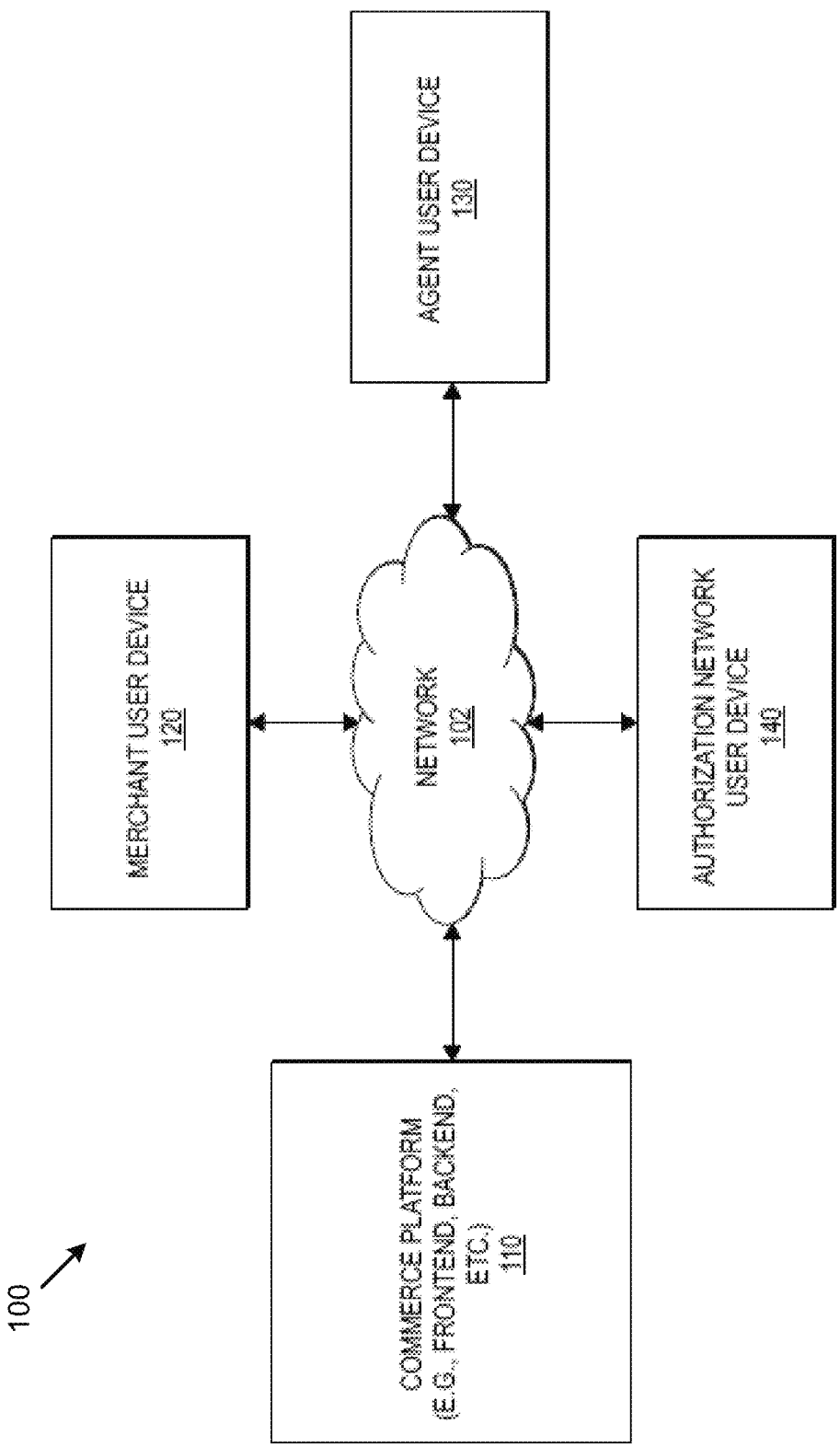
FIG. 1 is a block diagram of an example of a network environment of a workflow system.

In the following description, numerous details are set forth to provide a more thorough explanation of the present disclosure. It will be apparent, however, to one skilled in the art, that the present disclosure may be practiced without these specific details. In other instances, well-known structures and devices are shown in block diagram form, rather than in detail, to avoid obscuring the present disclosure.

A workflow may refer to a sequence of tasks, activities, or steps involved from the beginning to the end of a working process. The terms "task" and "activity" may be used interchangeably in this disclosure. Workflows occur across every kind of business and industry. There are a lot of workflows that happen in a commerce system, e.g., a commerce platform. For example, the workflows may include querying a database to retrieve relevant information that matches a type of users, and then sending messages to the type of users regarding payment, trial status, account status, refund, etc. It may be time consuming to develop the workflows. For example, it may take many weeks to build important workflows for the commerce payment system. Currently, the workflows need to be created from scratch by trained engineers. Non-technical persons need to wait for the engineers to build and test the workflows, which may cause a long delay and consume a lot of engineering resources. There may be a need to develop a method and a system to enable the non-technical persons to perform the tasks or activities they are intended to do without having to wait for the engineers.

Techniques are disclosed herein for creating (or defining) and executing a workflow. A method and system for defining (or creating) and executing the workflow are provided herein. In some embodiments, the method and system provides a no code solution to define and execute the workflow. For example, user interface (UI) components may be dragged and dropped in an UI to define a workflow. The UI may be a user interface of a frontend of a workflow system such as a payment processing system, a dispute resolution tool, an escrow disbursement system where a payment is made upon successful delivery of an asset, etc. The workflow system may include one or more computing devices. The workflow system may include one or more computing devices to run a workflow such as a payment processing workflow, a dispute resolution workflow, an escrow disbursement work flow, etc. When a user may drag and drop the UI components, the frontend may dynamically define or create the workflow. The user may be a non-technical person such as a customer service representative. A backend of the workflow system may execute the workflow in a fault-tolerant system, even under container failure scenarios. The frontend may include one or more devices of the workflow system, with which the user may interact. The backend may include one or more devices of the workflow system, which are not directly accessed by the user, typically responsible for storing and manipulating data. For example, the frontend may be a part of a web browser, while the backend may run on a collection of servers in the cloud. As an example, the workflow system may include a portion of a payment processing system, e.g., a portion of the payment processing system for an internal operation of a business, not including a portion of the payment processing system for customer interactions. Users may simply drag and drop different UI components, which may be associated with different tasks such as querying a database, sending emails. The workflow may be created by the frontend accordingly. The frontend may create the workflow in a domain specific language (DSL). The backend may execute the workflow, thereby performing the task.

In this way, the user, the non-technical person, may be able to define and execute the work flow to perform the tasks or activities they are intended to do, without having to wait for the trained engineers. Therefore, the workload of the engineers may be reduced. The same UI component for the same task may be reused, thereby saving computing resources and improving computing efficiency. Accordingly, the embodiments of the present disclosure reduce the amount of networking resources needed to perform the tasks. Furthermore, the workflow may be executed in the backend in the fault-tolerant system which is a durable and robust system for recovering when failure occurs.

In some embodiments, a plurality of UI components associated with a plurality of tasks to be performed are presented on a first section of a UI, where each UI component of the plurality of UI components is associated with one task of the plurality of tasks. In response to one or more UI components of the plurality of UI components associated with one or more tasks of the plurality of tasks being moved from the first section of the UI to a second section of the UI, the workflow is created based on the one or more UI components and an order in which the one or more UI components being positioned in the second section of the UI. The workflow is executed to perform the one or more tasks of the plurality of tasks.

FIG. 1 is a block diagram 100 of an example of a network environment of a workflow system. In one embodiment, a system, e.g., a payment processing system, includes a commerce platform 110, a merchant user device 120, an agent user device 130, and an authorization network user device 140. In one embodiment, the workflow system is part of the commerce platform 110. In one embodiment, user devices (e.g., devices 120, 130, and 140) may be mobile computing devices, such as a smartphone, tablet computer, smartwatch, etc., as well computer systems, such as a desktop computer system, laptop computer system, server computer systems, etc. The commerce platform 110 may also be one or more computing devices, such as one or more server computer systems, desktop computer systems, etc.

The commerce platform 110, merchant user device 120, agent user device 130, and authorization network user device 140 may be coupled to a network 102 and communicate with one another using any of the standard protocols for the exchange of information, including secure communication protocols. In one embodiment, one or more of the commerce platform 110, merchant user device 120, agent user device 130, and authorization network user device 140 may run on one Local Area Network (LAN) and may be incorporated into the same physical or logical system, or different physical or logical systems. Alternatively, the commerce platform 110, merchant user device 120, agent user device 130, and authorization network user device 140 may reside on different LANs, wide area networks, cellular telephone networks, etc. that may be coupled together via the Internet but separated by firewalls, routers, and/or other network devices. In one embodiment, commerce platform 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc. In one embodiment, commerce platform 110 provides software service, e.g., financial processing services to one or more of merchant user device 120, agent user device 130, and/or authorization network user device 140, such as managing accounts, running financial transactions, clearing transactions, performing payouts to agents, managing merchant and/or agent accounts, as well as other services typically associated with commerce platforms systems such as, for example, STRIPE™.

In one embodiment, the commerce platform 110 may include a computing system having one or more computing devices. The commerce platform 110 may include a portion of a payment processing system, e.g., a portion of the payment processing system for an internal operation of a business, not including a portion of the payment processing system for customer interactions. A lot of workflows may happen in the commerce platform 110. For example, a workflow may include querying a database to retrieve relevant information that matches a type of clients, and then sending messages to the type of clients regarding payment, trial status, account status, refund, etc.

Figure 2:
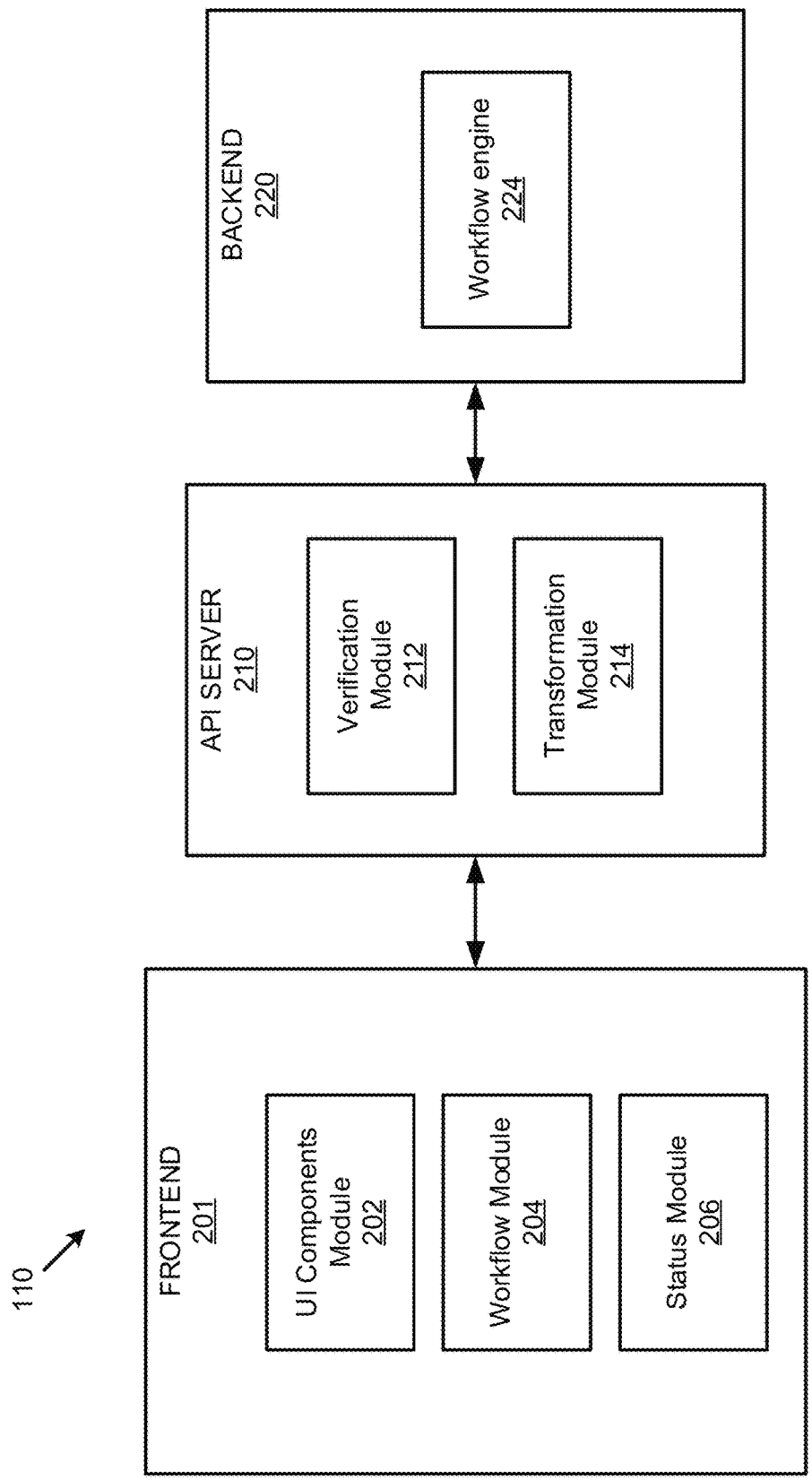
FIG. 2 is a block diagram illustrating an example of a workflow system.

FIG. 2 is a block diagram 200 illustrating an example of a workflow system. The workflow system may include a part of the commerce platform (e.g., the commerce platform 110 in FIG. 1) of a payment processing system, a dispute resolution tool, an escrow disbursement system, etc. The workflow system may include a computing system with one or more computing devices to run a workflow such as a payment processing workflow, a dispute resolution workflow, an escrow disbursement work flow, etc. As an example, the workflow system may be a portion of a payment processing system, e.g., a portion of the payment processing system for an internal operation of a business, not including a portion of the payment processing system for customer interactions. The workflow system may include a frontend 201, an application programming interface (API) server 210 and a backend 220. The frontend 201 may include one or more devices of the workflow system, with which the user may interact. As an example, the user may be a non-technical person. The backend 220 may include one or more devices of the workflow system, which are not directly accessed by the user and may be responsible for storing and manipulating data.

The frontend 201 may include a UI components module 202, a workflow module 204 and a status module 206. UI components module 202 may present multiple UI components on a first section of a UI. The multiple UI components may be associated with multiple tasks to be performed, where each UI component of multiple UI components is associated with one task of the multiple tasks. For example, Each UI component comprises a task, an input and an output of the task. The user may move, e.g., drag and drop, one or more UI components associated with one or more tasks from the first section of the UI to a second section of the UI. The workflow module 204 may dynamically create or define a workflow, e.g., in domain specific language (DSL), based on the one or more UI components and an order in which the one or more UI components being positioned in the second section of the UI. The one or more UI components may be reordered by the user in the second section of the UI. The workflow module 204 may dynamically update the workflow accordingly. The status module 206 may show a status of performing the one or more tasks. The frontend 201 may transmit the workflow in the DSL to the API server 210.

API server 210 may include a verification module 212 and a transformation module 214. Verification module 212 may verify the workflow is valid. Transformation module 214 may parse the work flow. Transformation module 214 may transform the workflow in the DSL to a way a workflow engine in the backend 220 can understand. API server 210 may transmit the transformed or parsed workflow to the backend 220.

The backend 220 may include a fault-tolerant workflow engine 224, which may execute the transformed or parsed workflow to perform the one or more tasks associated with the one or more UI components.

Figure 3A:
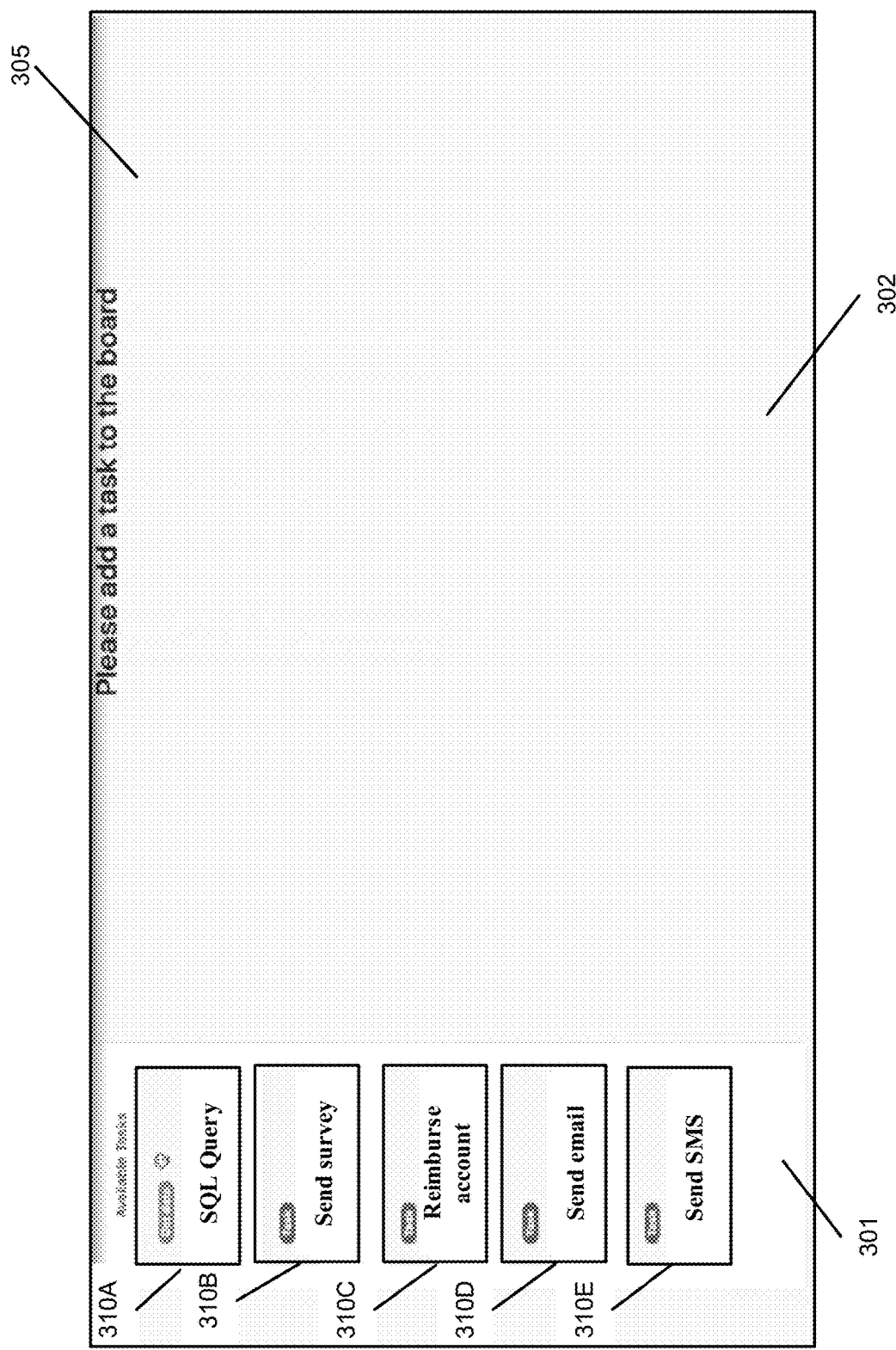
FIGS. 3A-3D are block diagrams illustrating of examples of a user interface of a workflow system.

FIGS. 3A-3D are block diagrams illustrating of examples of a UI 305 of a frontend of a workflow system. As illustrated in FIG. 3A, the UI 305 may include a section 301 (e.g., left hand panel) and a section 302 (e.g., right hand panel). As an example, the section 301 may be on the left, and the section 302 may be on the right. As another example, the section 301 may be on the right, and the section 302 may be on the left. As yet another example, the section 301 may be on the top, and the section 302 may be on the bottom. As yet another example, the section 301 may be on the bottom, and the section 302 may be on the top. There may be different arrangements and shapes of the section 301 and the section 302.

FIG. 3A and the other figures may use like reference numerals to identify like elements. A letter after a reference numeral, such as "310A," indicates that the text refers specifically to the element having that particular reference numeral. A reference numeral in the text without a following letter, such as "310," refers to any or all of the elements in the figures bearing that reference numeral.

Referring to FIG. 3A, the section 301 may include a set of UI components 310 (310A, 310B, 310C, 310D, 310E) associated with a set of tasks (available tasks). The set of tasks may include a wide variety of generic tasks to be performed. Each UI component may be associated with one task of the set of tasks. For example, UI components 310A may be associated with a task of writing a structured query language (SQL) query, e.g., to retrieve relevant information regarding a certain type of clients from a database. UI components 310B may be associated with a task of sending survey. UI components 310C may be associated with a task of reimbursing an account. UI components 310D may be associated with a task of sending an email. UI components 310E may be associated with a task of sending a short message service (SMS). The above UI components 310A, 310B, 310C, 310D, 310E are just a few example. The UI components 310 may include a wide variety of UI components associated with a wide variety of generic tasks to be performed, not being limited to the few examples above. The set of UI components 310 may be associated with any relevant business logic units. The writing the SQL query, sending an email or reimbursing an account are just a few examples of the business logic units. Other examples of business logic units include moving data from one system to another (e.g. from an excel spreadsheet to a database) and calling a 3rd party API (e.g. the weather API for a city).

The UI components 310 may be interactive elements with which the user(s) interacts. The UI components 310 may be generic components that may be dragged and dropped to the section 302, which is, for example, a canvas area. Each UI component may have fields such as a task associated with the UI component, an input of the task and an output of the task. Each UI component may include a description of the task with which the UI component is associated, the arguments, the input(s) and output(s) of the task.

One or more UI components 310 may be dragged and dropped to the section 302 by the user. The user may be a customer service or other non-technical person. The user may place the one or more UI components 310 in an order, which is associated with a series of tasks to perform. The workflow may be defined or created according to the one or more UI components 310 and the order in which the one or more UI components 310 are being placed. As an example, the order in which the one or more UI components 310 are being placed may be from top to bottom, or vice versa. Alternatively, the order in which the one or more UI components 310 are being placed may be from right to left, or vice versa. The workflow may be executed starting from the UI Components on the top and ending with the UI components at the bottom. A UI component placed above may be executed earlier than a UI component placed below. The inputs and outputs of the one or more UI components 310 may be mapped accordingly. For example, the outputs of the UI component(s) placed above may be inputs of the UI component(s) placed below.

The workflow may be defined or created by the frontend in DSL dynamically as the one or more UI components 310 being dragged and dropped to the section 302 one by one. The workflow may be updated by the frontend in DSL dynamically as the one or more UI components 310 being reordered in the section 302. In this way, the tasks that typically would have been performed by engineers may be handled by non-technical persons. The UI components are further reusable for another workflow. Thus, the amount of networking resources needed to create the workflows may be reduced. The workflow may be executed in the backend in a durable and robust fault-tolerant system for recovering when failure occurs.

Figure 3B:
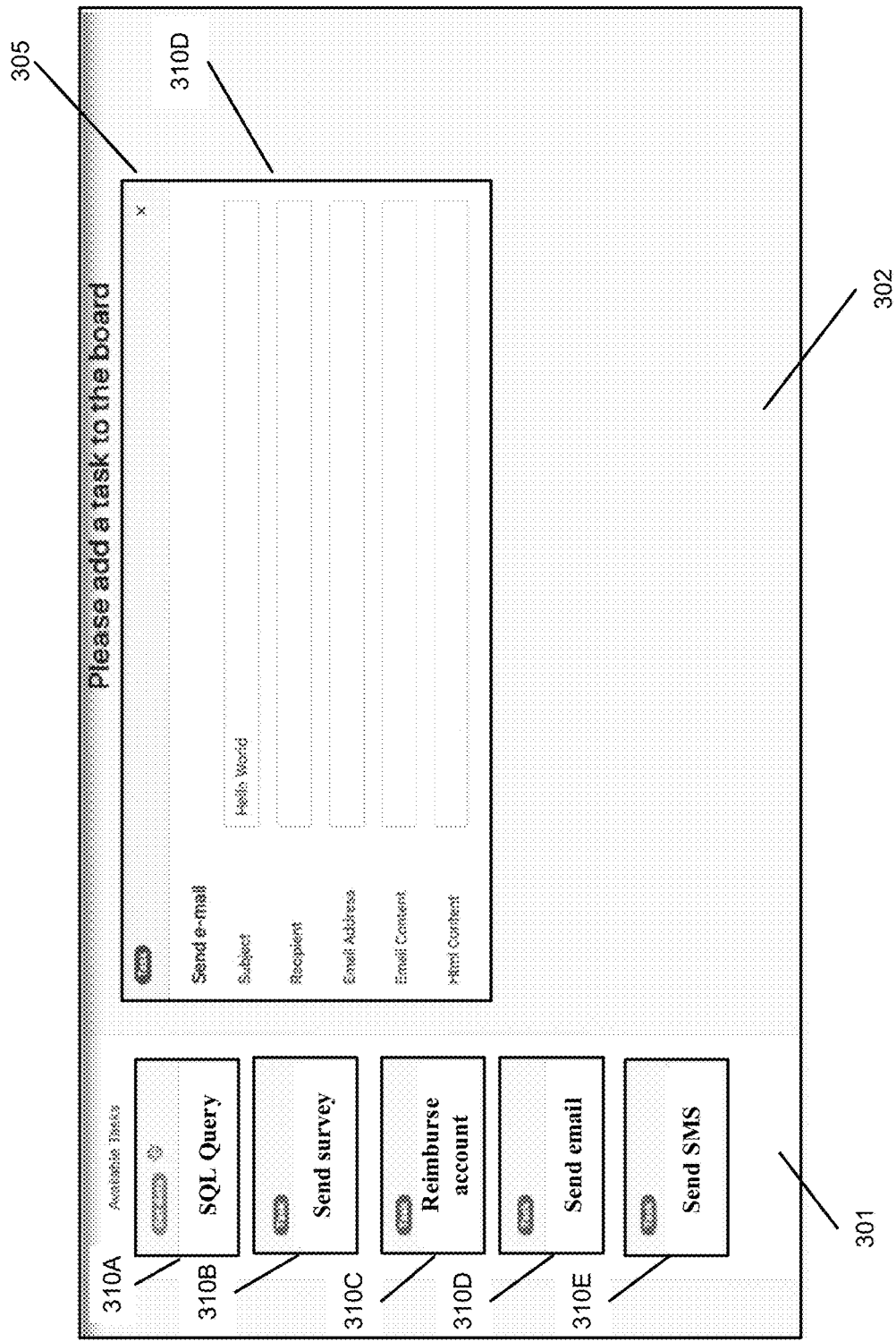

As illustrated in FIG. 3B, for example, if the user may want to send an email to a certain type of clients (e.g., from a certain country), the user may drag and drop UI component 310D to the section 302. UI component 310D may include fields such as a task of sending email, an input of the task and an output of the task. The input and/or output of the task may be tied to another task. The fields of the UI component 310D may be automatically filled based on outputs from a previous task by the frontend, or may be filled by the user on the UI, depending on the DSL configurations and the related workflows. As the UI component 310D being dragged and dropped to the section 302, the frontend may create the workflow including the task of sending email in DSL dynamically.

Figure 3C:
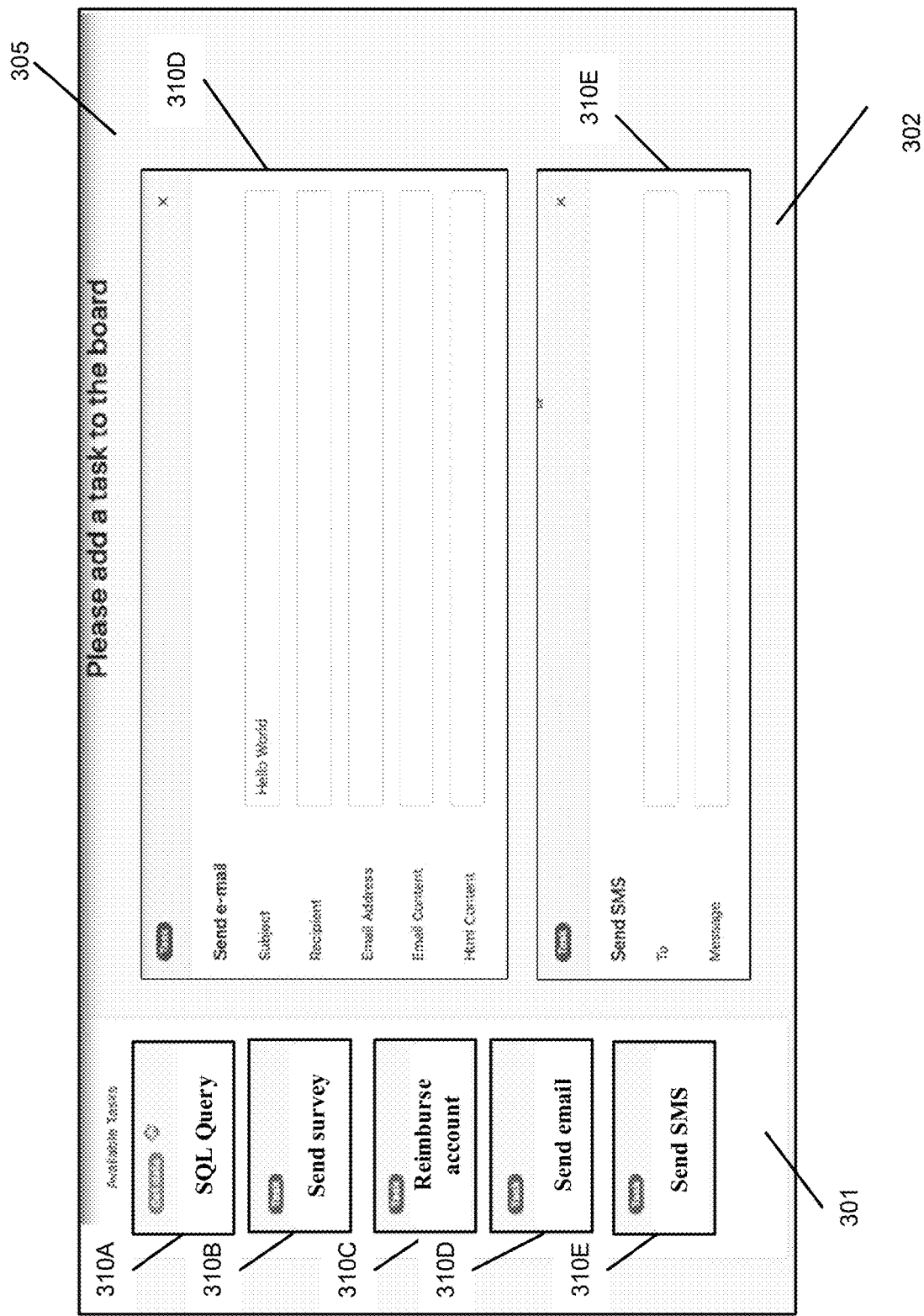

As illustrated in FIG. 3C, if the user may further want to send an SMS to a certain type of clients (e.g., from a certain country), the user may drag and drop UI component 310E to the section 302 and position UI component 310E below UI component 310D. UI component 310D may include fields such as a task of sending SMS, an input of the task and an output of the task. As the UI component 310E being dragged and dropped to the section 302, the frontend may update the workflow by adding the task of sending SMS in DSL dynamically. As an example, when the user may hit a "Submit" or "Run" button, the workflow may start to run or execute.

Figure 3D:
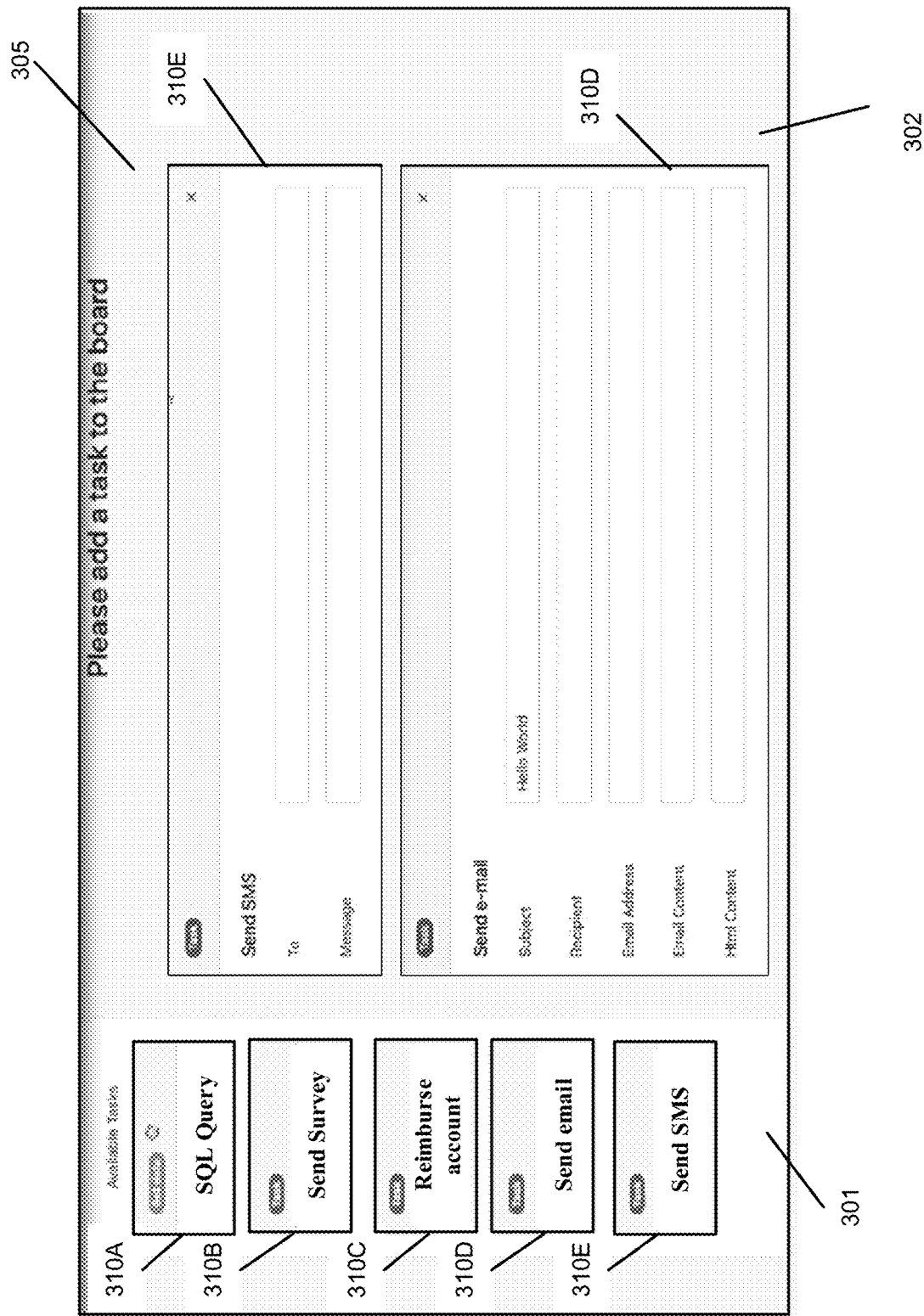

Referring to FIG. 3D, the UI components 310 may be reordered, or reused (e.g., used more than once) in different ways. The UI components 310 may be composed in a variety of ways and reused as needed. For example, the user may reorder the UI component 310E and the UI component 310D by positioning the UI component 310E above the UI component 310D. The frontend may update the workflow to perform the task of sending SMS before the task of sending email. By doing so, the amount of networking resources needed to perform the tasks may be reduced. The reusable UI components may increase the efficiency of creating the workflows.

Figure 4A:
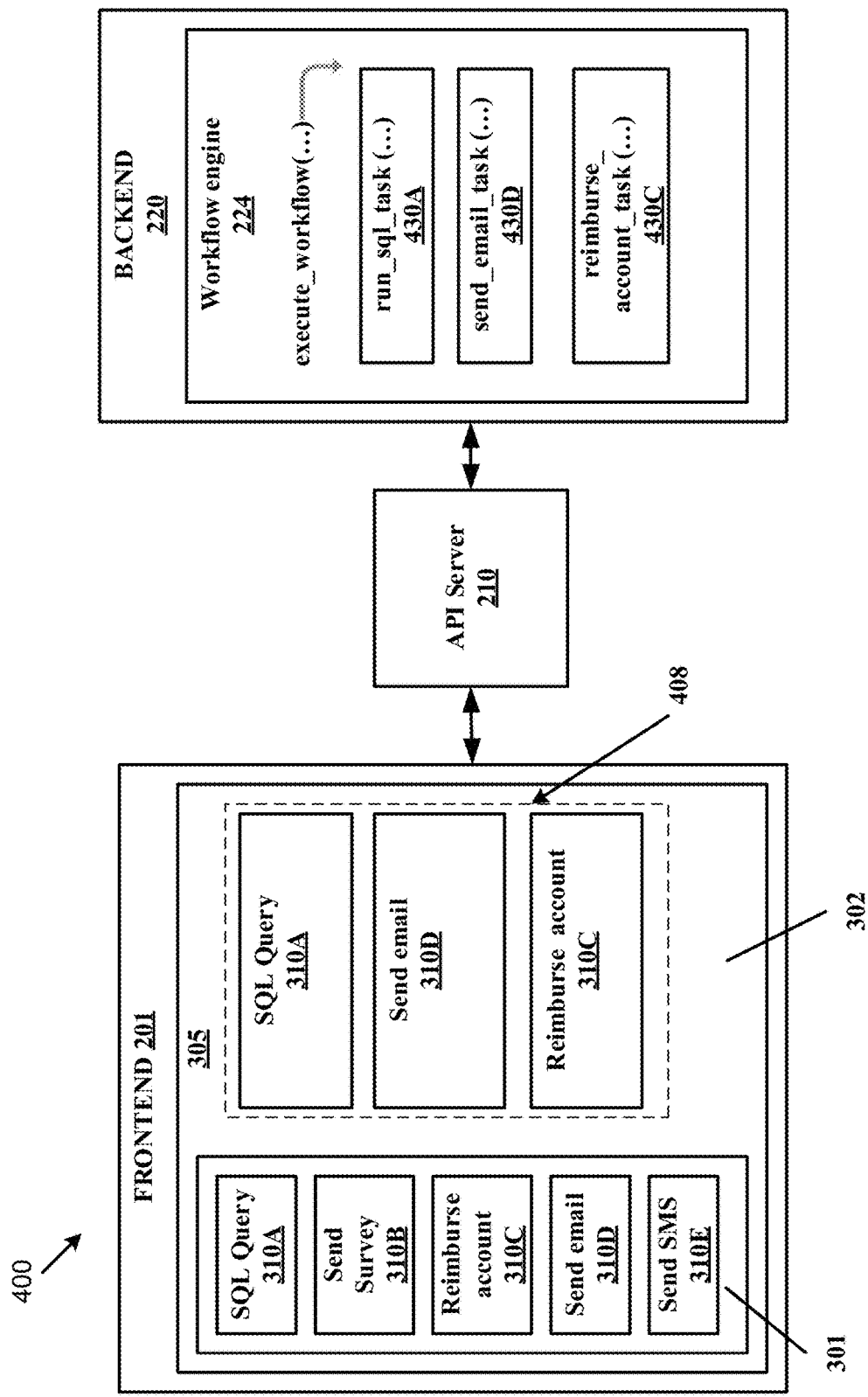
FIGS. 4A-4B are block diagrams of an example of creating and executing a workflow in a workflow system.
Figure 4B:
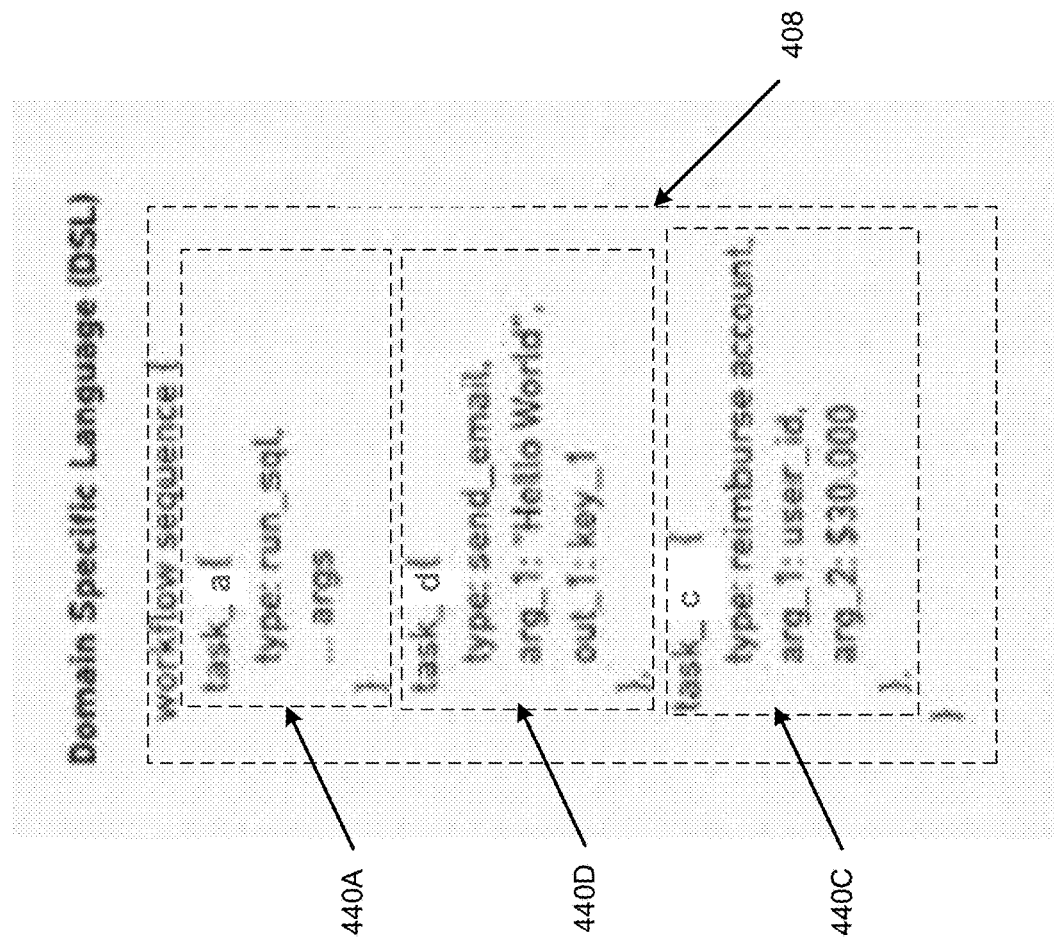

FIGS. 4A-4B are block diagrams of an example of creating and executing a workflow 408 in a workflow system 400. The workflow 408 may include any workflow such as a payment processing workflow, a dispute resolution workflow, an escrow disbursement work flow, etc. As an example, the workflow 408 may be a workflow in a process of customer service or internal operation of a payment processing system. In this example, a user may want to refund a certain type of client thirty dollars, which may be an over-charge amount. Previously, engineers would need to write code for the workflow. The method and system described herein provide a solution to enable the user, who may be a non-technical person, to define and execute the workflow. The workflow 408 may include the operations of writing a SQL query to retrieve relevant information regarding the type of clients, sending emails to the type of clients and reimbursing accounts of the type of clients.

Referring to FIG. 4A, the workflow system 400 may include a frontend 201, an API server 210 and a backend 220. The frontend 201 may include one or more devices of the workflow system 400, with which the user may interact. The backend 220 may include one or more devices of the workflow system 400, which are not directly accessed by the user and may be responsible for executing the workflow, storing and manipulating data. The frontend 201 may have a UI 305, which may include a section 301 (e.g., the left panel) and a section 302 (e.g., the right panel). In the section 301, a set of available UI components 310 may be displayed. The set of UI components 310 may be associated with a set of tasks. Each UI component 310 may be associated with one task of the set of tasks. For example, UI components 310A may be associated with a task of writing a structured query language (SQL) query, e.g., to retrieve relevant information regarding a certain type of clients from a database. UI components 310C may be associated with a task of reimbursing an account. UI components 310D may be associated with a task of sending an email.

Each UI component may include a description of the task with which the UI component is associated, the arguments, the input(s) and output(s) of the task. The user may drag and drop the UI components 310 from the section 301 and place the UI components 310 in an order in the section 302. Thus, the workflow 408 may be defined according to the UI components 310 in the order in the section 302.

Referring to FIGS. 4A and 4B, as the user dragging and dropping one or more UI components, e.g., 310A, 310D, and 310C, in the section 302, the frontend 201 may dynamically create the workflow 408, for example, in a DSL, which may be a high level language. The workflow 408 in the DSL may include one or more blocks, e.g., 440A, 440D, 440C. Each of the one or more blocks 440 may correspond to one task associated with one or more UI components. For example, as the user dragging and dropping the UI component 310A in the section 302, the frontend 201 may dynamically create the block 440A to perform the task of writing the SQL query to retrieve relevant information regarding the type of clients. As the user further dragging and dropping the UI component 310D and the UI component 310D in the section 302, the frontend 201 may dynamically create the block 440D to perform the task of sending email to the type of clients, and create the block 440C to perform the task of reimbursing the accounts of the type of clients accordingly. The output(s) of the earlier block(s) may be mapped to the input(s) of the later black(s). For example, the outputs of the block 440A to write the SQL query may be used as inputs for the block 440D to send email and the block 440C to reimburse the accounts.

The UI components 310 may be composed in a variety of ways. The UI components 310 may be reordered and reused as needed. While the UI components 310 being reordered by the user, the frontend 201 may dynamically update the blocks 440 in the workflow 408 according to the reordering of the UI components 310. When there is a change in the UI components 310 in the section 302, there will be a corresponding change in the blocks 440 in the DSL created by the frontend 201 dynamically. The blocks 440 associated with the UI components 310 may be composed and reused to build durable workflows.

Referring to FIG. 4A, the browser may send the DSL workflow 408 to the API server 410. For example, the browser may send the DSL workflow 408 to the API 410 server over a hypertext transfer protocol (HTTP) request. The browser may send the DSL workflow 408 to the API server over other protocols. The API server 410 may store the state of the DSL workflow 408. The API server 410 may verify that the DSL workflow 408 is valid. The DSL may be a language which the API server 410 knows how to parse. The API server 410 may The API server 410 may parse that the UI components 310 are accurately configured. For example, the API server 410 may verify that the tasks are valid and the inputs and outputs of the tasks are lined up. The API server 410 may transform the DSL workflow 408 to a way a workflow engine 224 in the backend 220 can understand such that the workflow engine 224 may execute the workflow 408. The workflow engine 224 in the backend 220 may be a low level tool, thus, the API server 410 may wrap the workflow engine 224.

The API server 410 may transmit the DSL workflow 408 to the workflow engine 224 in the backend 220. The workflow engine 224 in the backend 220 may execute the workflow in one or more steps 430. Each UI component 310 in the frontend may have a corresponding step 430 in the backend 220 to perform the corresponding task. For example, UI components 310A in the frontend may be associated with a task of writing a SQL query to retrieve relevant information regarding a certain type of clients from a database. Thus, UI component 310A in the frontend may have a corresponding step 430A in the backend 220 to perform the task of writing the SQL query. Similarly, UI components 310C in the frontend may be associated with a task of reimbursing accounts, and may have a corresponding step 430C in the backend 220 to perform the task of reimbursing accounts. UI components 310D in the frontend may be associated with a task of sending emails, and may have a corresponding step 430D in the backend 220 to perform the task of sending emails.

The workflow engine 224 in the backend 220 may be a fault-tolerant workflow engine which may have the fault tolerance properties. Fault tolerance is the property that enables a system to continue operating properly in the event of the failure of one or more faults within some of its components. For example, while executing the workflow running the tasks in the fault-tolerant workflow engine 224, a failure occurs e.g., a computer goes down. The fault-tolerant workflow engine 224 will retain the execution up until the point when the failure occurs and resume the workflow from the point onwards. As an example, the fault-tolerant workflow engine may include a Temporal™ engine. A custom workflow written using Temporal may execute the workflow and ensure a completion of performing the tasks.

In one embodiment, the execution state of the workflow may be exposed to the API server 410, or be transmitted to the frontend 201. The status of execution of the workflow may indicate a status of performing the one or more tasks. The status of performing the one or more tasks may be presented to the user. Thus, interaction(s) with the workflow may be created as the workflow is running. The user may interact with the workflow while the workflow is running. For example, the user may pause the workflow to confirm something, or change the workflow.

Figure 5:
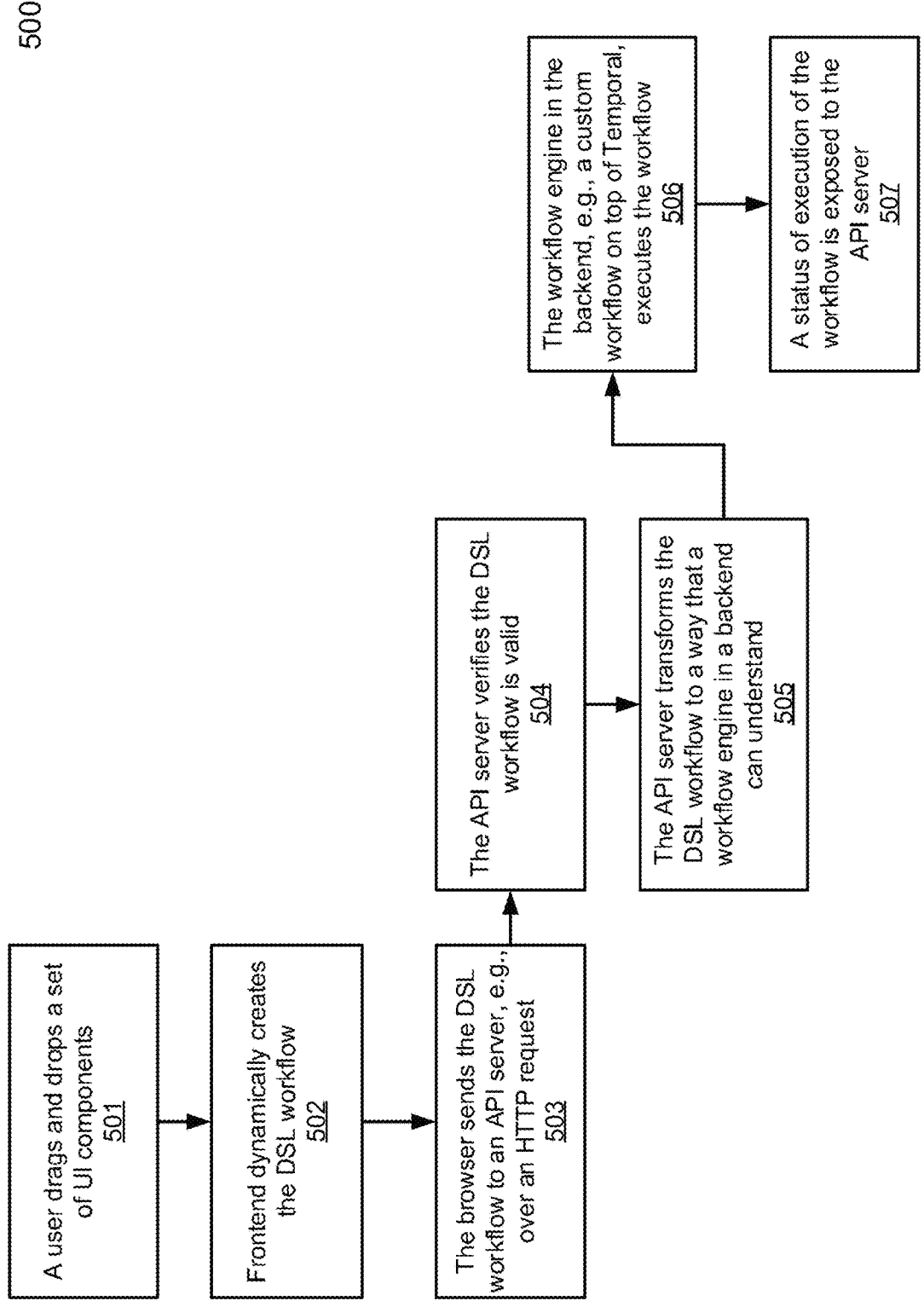
FIG. 5 is a flow diagram of one embodiment of a process of creating and executing a workflow.

FIG. 5 is a data flow diagram 500 of an example of a process of creating and executing a workflow. In one embodiment, the processes are performed by processing logic that may comprise hardware (circuitry, dedicated logic, etc.), software (e.g., software running on a chip), firmware, or a combination of the three. In one embodiment, the process is performed by a payment processing system of a payment processor.

At block 501, a user, who is a non-technical person, drags and drops one or more UI components of a set of UI components. The one or more UI components are associated with one or more tasks of a set of tasks. For example, the user may simply drag and drop the one or more UI components in an UI of a frontend. Each UI component is associated with one task.

At block 502, a frontend dynamically creates the DSL workflow, as the user dragging and dropping the one or more UI components. The DSL workflow may include one or more blocks corresponding to the one or more UI components, where each block corresponds to one UI component At block 503, a browser of the frontend sends the DSL workflow to an API server, e.g., over an HTTP request.

At block 504, the API server verifies the DSL workflow is valid.

At block 505, the API server transforms the DSL workflow to a way that a workflow engine in a backend can understand.

At block 506, the workflow engine in the backend, e.g., a custom fault-tolerant workflow on top of Temporal, executes the workflow. The workflow engine in the backend may execute the workflow in one or more steps. Each UI component in the frontend may have a corresponding step in the backend to perform the corresponding task.

At block 507, a status of execution of the workflow is exposed to the API serve. The status of execution of the workflow may indicate a status of performing the one or more tasks, which may be presented to the user.

In this way, the user may be able to define and execute the workflow to perform the tasks or activities, without having to wait for the trained engineers. Therefore, the workload of the engineers may be reduced. The same UI component for the same task may be reused, thereby saving computing resources, improving computing efficiency and reducing the amount of networking resources needed to perform the tasks. Furthermore, the workflow may be executed in the backend in the fault-tolerant workflow engine.

Figure 6:
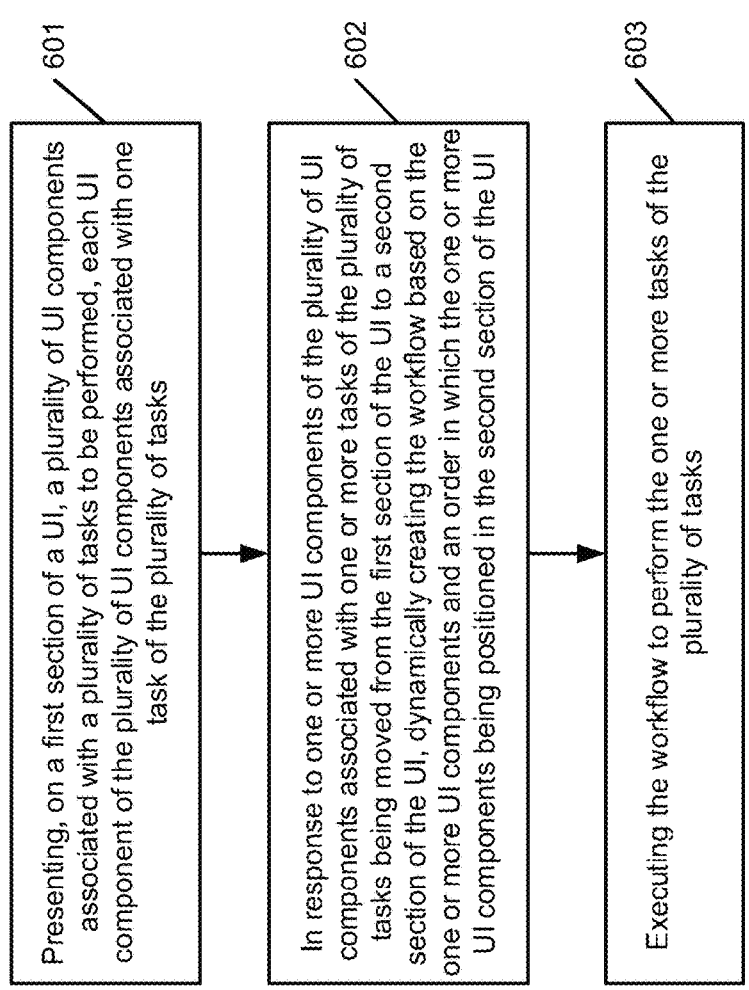
FIG. 6 is a flow diagram of another embodiment of a process of creating and executing a workflow.

FIG. 6 is a data flow diagram 600 of one embodiment of a process of creating and executing a workflow. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 6, the process begins by presenting, on a first section of a UI, a plurality of UI components associated with a plurality of tasks to be performed, each UI component of the plurality of UI components associated with one task of the plurality of tasks (processing block 601).

Then, in response to one or more UI components of the plurality of UI components associated with one or more tasks of the plurality of tasks being moved from the first section of the UI to a second section of the UI, dynamically creating the workflow based on the one or more UI components and an order in which the one or more UI components being positioned in the second section of the UI (processing block 602).

Finally, processing logic performs executing the workflow to perform the one or more tasks of the plurality of tasks (processing block 603).

Figure 7:
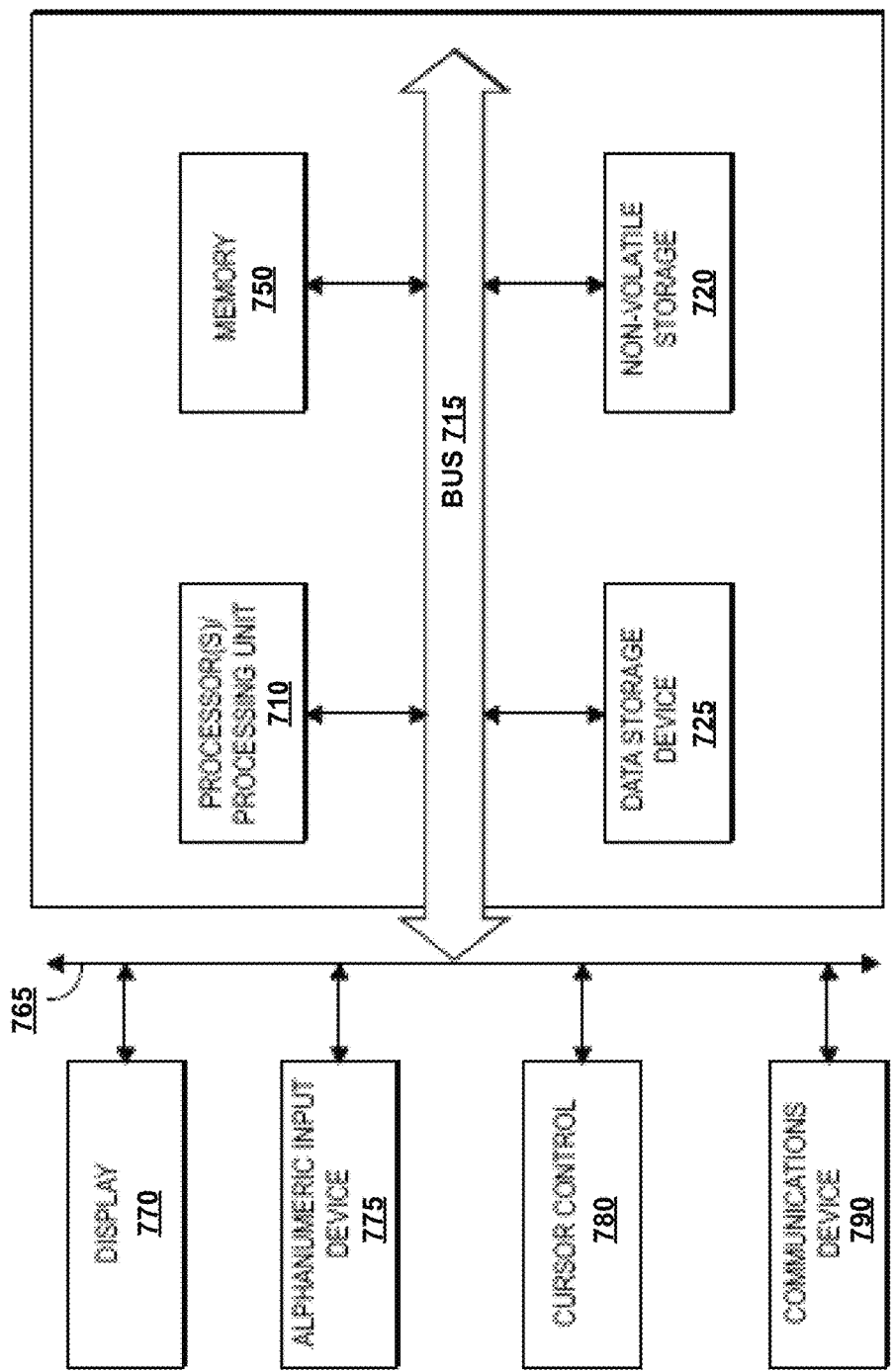
FIG. 7 is a block diagram of one embodiment of a computer system that may be used to support the systems and operations discussed herein.

FIG. 7 is one embodiment of a computer system 700 that may be used to support the systems and operations discussed herein. It will be apparent to those of ordinary skill in the art, however, that other alternative systems of various system architectures may also be used.

The data processing system illustrated in FIG. 7 includes a bus or other internal communication means 715 for communicating information, and a processor(s) 710 coupled to the bus 715 for processing information. The system further comprises a random-access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor(s) 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 570.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

In one embodiment, processor(s) 710 executes instructions to perform any of the operations described above including, but not limited to, presenting, on a first section of a user interface (UI), a plurality of UI components associated with a plurality of tasks to be performed, each UI component of the plurality of UI components associated with one task of the plurality of tasks; in response to one or more UI components of the plurality of UI components associated with one or more tasks of the plurality of tasks being moved from the first section of the UI to a second section of the UI, dynamically creating the workflow based on the one or more UI components and an order in which the one or more UI components being positioned in the second section of the UI; and executing the workflow to perform the one or more tasks of the plurality of tasks.

It will be appreciated by those of ordinary skill in the art that any configuration of the system may be used for various purposes according to the particular implementation. The control logic or software implementing the described embodiments can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The embodiments discussed herein may also be embodied in a handheld or portable device containing a subset of the computer hardware components described above. For example, the handheld device may be configured to contain only the bus 765, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need to be present for the device to function.

There are a number of example embodiments described herein.

Example 1 is a method for defining and executing a workflow, the method comprising: presenting, on a first section of a user interface (UI), a plurality of UI components associated with a plurality of tasks to be performed, each UI component of the plurality of UI components associated with one task of the plurality of tasks; in response to one or more UI components of the plurality of UI components associated with one or more tasks of the plurality of tasks being moved from the first section of the UI to a second section of the UI, dynamically creating the workflow based on the one or more UI components and an order in which the one or more UI components being positioned in the second section of the UI; and executing the workflow to perform the one or more tasks of the plurality of tasks.

Example 2 is the method of example 1 that may optionally include that each UI component comprises a description of a task, an argument, an input and an output of the task.

Example 3 is the method of example 1 that may optionally include that in response to the one or more UI components associated with the one or more tasks being reordered in the second section of the UI, dynamically updating the workflow.

Example 4 is the method of example 1 that may optionally include that presenting, on the first section of the UI of a frontend of a workflow system, the plurality of UI components associated with the plurality of tasks to be performed, and dynamically creating, by the frontend, the workflow in domain specific language (DSL) based on the one or more UI components and the order in which the one or more UI components being positioned in the second section of the UI.

Example 5 is the method of example 4 that may optionally include that transmitting, by the frontend, the workflow in the DSL to an application programming interface (API) server.

Example 6 is the method of example 5 that may optionally include that verifying, by the API server, the workflow is valid.

Example 7 is the method of example 6 that may optionally include that transforming, by the API server, the workflow and transmitting, by the API server, the workflow to a backend of the workflow system.

Example 8 is the method of example 7 that may optionally include that executing, by the backend, the workflow in a fault-tolerant workflow engine to perform the one or more tasks of the plurality of tasks.

Example 9 is the method of example 8 that may optionally include that exposing, by the backend, a status of an execution of the workflow to the API server to present a status of performing the one or more tasks of the plurality of tasks.

Example 10 is one or more non-transitory computer readable storage media having instructions stored thereupon which, when executed by a system having at least a processor and a memory therein, cause the system to perform operations comprising: presenting, on a first section of a user interface (UI) a plurality of UI components associated with a plurality of tasks to be performed, each UI component of the plurality of UI components associated with one task of the plurality of tasks; in response to one or more UI components of the plurality of UI components associated with one or more tasks of the plurality of tasks being moved from the first section of the UI to a second section of the UI, dynamically creating, the workflow based on the one or more UI components and an order in which the one or more UI components being positioned in the second section of the UI; and executing the workflow to perform the one or more tasks of the plurality of tasks.

Example 11 is the computer readable storage media of example 10 that may optionally include that each UI component comprises a description of a task, an argument, an input and an output of the task.

Example 12 is the computer readable storage media of example 10 that may optionally include that, the operations further comprise, in response to the one or more UI components associated with the one or more tasks being reordered in the second section of the UI, dynamically updating the workflow.

Example 13 is the computer readable storage media of example 10 that may optionally include that presenting, on the first section of the UI of a frontend of a workflow system, the plurality of UI components associated with the plurality of tasks to be performed, and dynamically creating, by the frontend, the workflow in domain specific language (DSL) based on the one or more UI components and the order in which the one or more UI components being positioned in the second section of the UI.

Example 14 is the computer readable storage media of example 13 that may optionally include that, the operations further comprise, transmitting, by the frontend, the workflow in the DSL to an application programming interface (API) server; and transforming, by the API server, the workflow, and transmitting, by the API server, the workflow to a backend of the workflow system.

Example 15 is the computer readable storage media of example 14 that may optionally include that executing, by the backend, the workflow in a fault-tolerant workflow engine to perform the one or more tasks of the plurality of tasks.

Example 16 is the computer readable storage media of example 15 that may optionally include that, the operations further comprise exposing, by the backend, a status of an execution of the workflow to the API server to present a status of performing the one or more tasks of the plurality of tasks.

Example 17 is a system comprising: a memory to store instructions; and one or more processors coupled to the memory to execute the stored instructions to: present, on a first section of a user interface (UI), a plurality of UI components associated with a plurality of tasks to be performed, each UI component of the plurality of UI components associated with one task of the plurality of tasks; in response to one or more UI components of the plurality of UI components associated with one or more tasks of the plurality of tasks being moved from the first section of the UI to a second section of the UI, dynamically create the workflow based on the one or more UI components and an order in which the one or more UI components being positioned in the second section of the UI; and execute the workflow to perform the one or more tasks of the plurality of tasks.

Example 18 is the method of example 17 that may optionally include that each UI component comprises a description of a task, an argument, an input and an output of the task.

Example 19 is the method of example 17 that may optionally include that the one or more processors are further to, in response to the one or more UI components associated with the one or more tasks being reordered in the second section of the UI, dynamically update the workflow.

Example 20 is the method of example 17 that may optionally include that the one or more processors are to present, on the first section of the UI of a frontend of a workflow system, the plurality of UI components associated with the plurality of tasks to be performed, and dynamically create, by the frontend, the workflow in domain specific language (DSL) based on the one or more UI components and the order in which the one or more UI components being positioned in the second section of the UI.

Example 21 is the method of example 20 that may optionally include that the one or more processors are further to, transmit, by the frontend, the workflow in the DSL to an application programming interface (API) server; and transform, by the API server, the workflow, and transmit, by the API server, the workflow to a backend of the workflow system.

Example 22 is the method of example 21 that may optionally include that the one or more processors are to, execute, by the backend, the workflow in a fault-tolerant workflow engine to perform the one or more tasks of the plurality of tasks.

Example 23 is the method of example 22 that may optionally include that the one or more processors are further to, expose, by the backend, a status of an execution of the workflow to the API server to present a status of performing the one or more tasks of the plurality of tasks.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the disclosure.

We claim:

1. A method for defining and executing a workflow comprising:
    presenting, on a first section of a user interface (UI), a plurality of UI components associated with a plurality of tasks to be performed, each UI component of the plurality of UI components associated with one task of the plurality of tasks;
    in response to one or more UI components of the plurality of UI components associated with one or more tasks of the plurality of tasks being moved from the first section of the UI to a second section of the UI, dynamically creating the workflow in domain specific language based on the one or more UI components and an order in which the one or more UI components being positioned in the second section of the UI; and
    executing the workflow to perform the one or more tasks of the plurality of tasks.

2. The method of claim 1, wherein each UI component comprises a description of a task, an argument, an input and an output of the task.

3. The method of claim 1, further comprising, in response to the one or more UI components associated with the one or more tasks being reordered in the second section of the UI, dynamically updating the workflow.

4. The method of claim 1, wherein the presenting, on the first section of the UI, the plurality of UI components associated with the plurality of tasks to be performed comprises presenting, on the first section of the UI of a frontend of a workflow system, the plurality of UI components associated with the plurality of tasks to be performed, and wherein the dynamically creating the workflow in the domain specific language comprises dynamically creating, by the frontend, the workflow in the domain specific language based on the one or more UI components and the order in which the one or more UI components being positioned in the second section of the UI.

5. The method of claim 4, further comprising transmitting, by the frontend, the workflow in the domain specific language to an application programming interface (API) server.

6. The method of claim 5, further comprising verifying, by the API server, the workflow is valid.

7. The method of claim 6, further comprising transforming, by the API server, the workflow and transmitting, by the API server, the workflow to a backend of the workflow system.

8. The method of claim 7, wherein the executing, by the backend, the workflow to perform the one or more tasks of the plurality of tasks comprises executing, by the backend, the workflow in a fault-tolerant workflow engine to perform the one or more tasks of the plurality of tasks.

9. The method of claim 8, further comprising exposing, by the backend, a status of an execution of the workflow to the API server to present a status of performing the one or more tasks of the plurality of tasks.

10. One or more non-transitory computer readable storage media having instructions stored thereupon which, when executed by a system having at least a processor and a memory therein, cause the system to perform operations comprising:
    presenting, on a first section of a user interface (UI) a plurality of UI components associated with a plurality of tasks to be performed, each UI component of the plurality of UI components associated with one task of the plurality of tasks;
    in response to one or more UI components of the plurality of UI components associated with one or more tasks of the plurality of tasks being moved from the first section of the UI to a second section of the UI, dynamically creating, the workflow in domain specific language based on the one or more UI components and an order in which the one or more UI components being positioned in the second section of the UI; and
    executing the workflow to perform the one or more tasks of the plurality of tasks.

11. The one or more non-transitory computer readable storage media of claim 10, wherein each UI component comprises a description of a task, an argument, an input and an output of the task.

12. The one or more non-transitory computer readable storage media of claim 10, wherein the operations further comprise, in response to the one or more UI components associated with the one or more tasks being reordered in the second section of the UI, dynamically updating the workflow.

13. The one or more non-transitory computer readable storage media of claim 10, wherein the presenting, on the first section of the UI, the plurality of UI components associated with the plurality of tasks to be performed comprises presenting, on the first section of the UI of a frontend of a workflow system, and wherein the dynamically creating the workflow in the domain specific language comprises dynamically creating, by the frontend, the workflow in the domain specific language based on the one or more UI components and the order in which the one or more UI components being positioned in the second section of the UI.

14. The one or more non-transitory computer readable storage media of claim 13, wherein the operations further comprise
    transmitting, by the frontend, the workflow in the domain specific language to an application programming interface (API) server; and
    transforming, by the API server, the workflow, and transmitting, by the API server, the workflow to a backend of the workflow system.

15. The one or more non-transitory computer readable storage media of claim 14, wherein the executing, by the backend, the workflow to perform the one or more tasks of the plurality of tasks comprises executing, by the backend, the workflow in a fault-tolerant workflow engine to perform the one or more tasks of the plurality of tasks.

16. The one or more non-transitory computer readable storage media of claim 15, wherein the operations further comprise exposing, by the backend, a status of an execution of the workflow to the API server to present a status of performing the one or more tasks of the plurality of tasks.

17. A system comprising:
    a memory to store instructions; and
    one or more processors coupled to the memory to execute the stored instructions to:
        present, on a first section of a user interface (UI), a plurality of UI components associated with a plurality of tasks to be performed, each UI component of the plurality of UI components associated with one task of the plurality of tasks;

in response to one or more UI components of the plurality of UI components associated with one or more tasks of the plurality of tasks being moved from the first section of the UI to a second section of the UI, dynamically create the workflow in domain specific language based on the one or more UI components and an order in which the one or more UI components being positioned in the second section of the UI; and execute the workflow to perform the one or more tasks of the plurality of tasks.

18. The system of claim 17, wherein each UI component comprises a description of a task, an argument, an input and an output of the task.

19. The system of claim 17, the one or more processors are further to, in response to the one or more UI components associated with the one or more tasks being reordered in the second section of the UI, dynamically update the workflow.

20. The system of claim 17, wherein;

the one or more processors are to present, on the first section of the UI, the plurality of UI components associated with the plurality of tasks to be performed comprises the one or more processors are to present, on the first section of the UI of a frontend of a workflow system, the plurality of UI components associated with the plurality of tasks to be performed, and the one or more processors are to dynamically create the workflow in the domain specific language comprises the one or more processors are to dynamically create, by the frontend, the workflow in the domain specific language (DSL)-based on the one or more UI components and the order in which the one or more UI components being positioned in the second section of the UI.

21. The system of claim 20, wherein the one or more processors are further to, transmit, by the frontend, the workflow in the DSL domain specific language to an application programming interface (API) server; and transform, by the API server, the workflow, and transmit, by the API server, the workflow to a backend of the workflow system.

22. The system of claim 21, wherein the one or more processors are to, execute, by the backend, the workflow in a fault-tolerant workflow engine to perform the one or more tasks of the plurality of tasks.

23. The system of claim 22, wherein the one or more processors are further to, expose, by the backend, a status of an execution of the workflow to the API server to present a status of performing the one or more tasks of the plurality of tasks.

* * * * *